United States Patent
Soma et al.

(10) Patent No.: US 11,628,711 B2
(45) Date of Patent: Apr. 18, 2023

(54) SIDE DOOR STRUCTURE FOR VEHICLE

(71) Applicant: HONDA MOTOR CO., LTD., Tokyo (JP)

(72) Inventors: Takayuki Soma, Wako (JP); Eiji Hirano, Wako (JP); Yu Iemura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/681,724

(22) Filed: Feb. 26, 2022

(65) Prior Publication Data
US 2022/0314754 A1    Oct. 6, 2022

(30) Foreign Application Priority Data

Mar. 30, 2021 (JP) .............................. JP2021-056574

(51) Int. Cl.
*B60J 5/04* (2006.01)
*B60R 21/02* (2006.01)

(52) U.S. Cl.
CPC ........... *B60J 5/0429* (2013.01); *B60J 5/0443* (2013.01); *B60R 21/02* (2013.01)

(58) Field of Classification Search
CPC ........ B60J 5/0443; B60J 5/042; B60J 5/0422; B60J 5/0429; B60J 5/0437; B60J 5/0431; B60J 5/0456; B60J 5/0458; B60J 5/0423; B60J 5/0444
USPC ...................................................... 296/146.6
See application file for complete search history.

(56) References Cited

U.S. PATENT DOCUMENTS

| | | | | |
|---|---|---|---|---|
| 5,370,437 A * | 12/1994 | Alberda | ................. | B60J 5/0437 296/187.12 |
| 6,942,281 B2 * | 9/2005 | Omori | ................... | B60J 5/0448 296/187.1 |
| 6,957,844 B2 * | 10/2005 | Chu | ....................... | B60J 5/0437 296/187.12 |
| 8,727,421 B2 * | 5/2014 | Cohoon | ................ | B60J 5/0425 296/146.6 |
| 11,091,012 B2 * | 8/2021 | Williams | ............... | B60J 5/0425 |
| 2002/0053812 A1 * | 5/2002 | Lee | ........................ | B60J 5/0444 296/146.6 |

FOREIGN PATENT DOCUMENTS

JP    2010-149841 A    7/2010

* cited by examiner

*Primary Examiner* — Joseph D. Pape
*Assistant Examiner* — Veronica M Shull
(74) *Attorney, Agent, or Firm* — Rankin, Hill & Clark LLP (57) ABSTRACT

Aside door structure for a vehicle includes a door beam that has hollow sections which are open at two ends in a longitudinal direction, and a hinge reinforcement member including a bent plate body in a crank shape that is joined to one of a front end and a rear end of the door beam. The hinge reinforcement member forms the crank shape by integrally forming a middle portion that closes an opening in the one of the front end and the rear end of the door beam and is joined to a stepped vertical wall of an inner panel of a side door, an outer end portion that is joined to a stepped outer side wall of the inner panel and an outer wall of the door beam, and an inner end portion that is joined to an inner wall of the door beam.

10 Claims, 9 Drawing Sheets

FIG. 10

SIDE DOOR STRUCTURE FOR VEHICLE

CROSS-REFERENCE TO RELATED APPLICATION

The present application claims the benefit of priority to Japanese Patent Application No. 2021-056574 filed on Mar. 30, 2021, the disclosures of all of which are hereby incorporated by reference in their entireties.

TECHNICAL FIELD

The present disclosure relates to a side door structure for a vehicle.

BACKGROUND

There has been known aside door structure for a vehicle in which a door beam is arranged to extend along an inside of a door skin (for example, see JP2010-149841A). This door beam is a tubular member obtained by roll-forming a steel plate and has a closed sectional shape that includes upper and lower double connected parts in a cross-sectional view crossing in a longitudinal direction. Specifically, with two right trapezoids arranged to be vertically symmetric, the cross section of the door beam forms a single substantial isosceles trapezoid as a whole. This door beam is arranged such that upper bases (short side) among the upper bases and lower bases forming the isosceles trapezoid face the door skin. With this, two legs forming the isosceles trapezoid are inclined such that an interval therebetween is gradually reduced toward the door skin.

According to the side door structure as described above, when an impact load is inputted to the door from outside the vehicle, a portion of the door beam corresponding to the legs of the above-described trapezoid inhibits deformation of the door beam and improves resistance of impact.

However, in a conventional side door structure (for example, see JP2010-149841A), strength to attach the door beam is insufficient due to an opening end portion of the door beam and a bracket that includes an open surface and attaches the end portion to a door panel (inner panel). A clearance is formed between the door and a vehicle body at a position corresponding to the end portion of the door beam, and there is no rigid structure member in the vehicle body.

Therefore, the conventional side door structure has a problem that, in a case of vehicle side impact, damage to the end portion or a peripheral member of the door beam increases deformation stroke of the door toward inside of a vehicle compartment.

In view of the above, an object of the present disclosure is to provide a side door structure that can reduce deformation stroke of a door toward inside of a vehicle compartment in a case of vehicle side impact more than ever before.

SUMMARY

A side door structure for a vehicle to solve the above-described problem A side door structure for a vehicle, includes: a door beam that has hollow sections which are open at two ends in a longitudinal direction; and a hinge reinforcement member including a bent plate body in a crank shape that is joined to one of a front end and a rear end of the door beam. The hinge reinforcement member forms the crank shape by integrally forming a middle portion that closes an opening in the one of the front end and the rear end of the door beam and is joined to a stepped vertical wall of an inner panel of a side door, an outer end portion that is joined to a stepped outer side wall of the inner panel and an outer wall of the door beam, and an inner end portion that is joined to an inner wall of the door beam.

According to the side door structure of the present disclosure, deformation stroke of a door toward inside of a vehicle compartment can be reduced in a case of vehicle side impact more than ever before.

DETAILED DESCRIPTION

Next, a side door structure in an embodiment (present embodiment) of the present disclosure is described in detail. The side door structure for a vehicle of this embodiment (hereinafter, simply referred to as a side door structure) is mainly characterized in that a hinge reinforcement member is arranged to close an opening in a front end portion of a door beam having a hollow section (closed section) and is also joined to each of the front end portion of the door beam and an inner panel.

Figure 1:
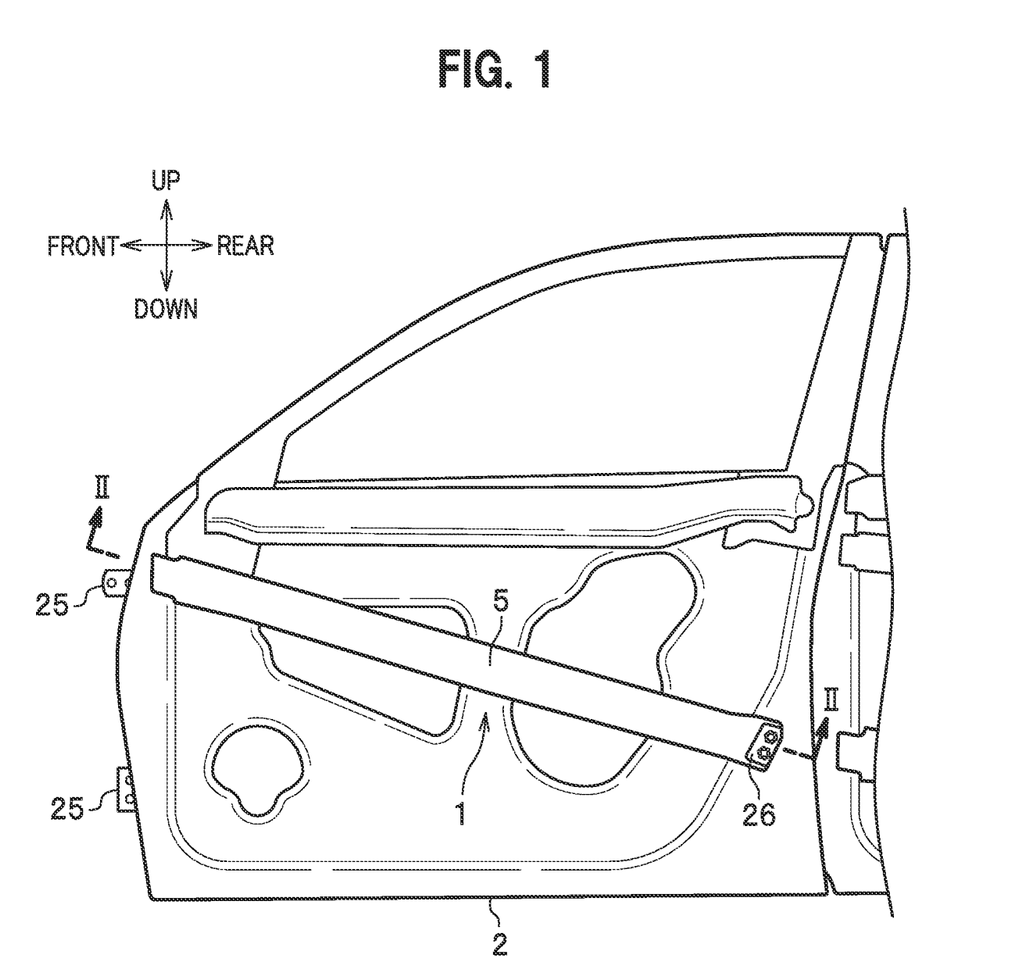
FIG. 1 is a side view of a side door applied with a side door structure for a vehicle according to an embodiment of the present disclosure.
Figure 2:
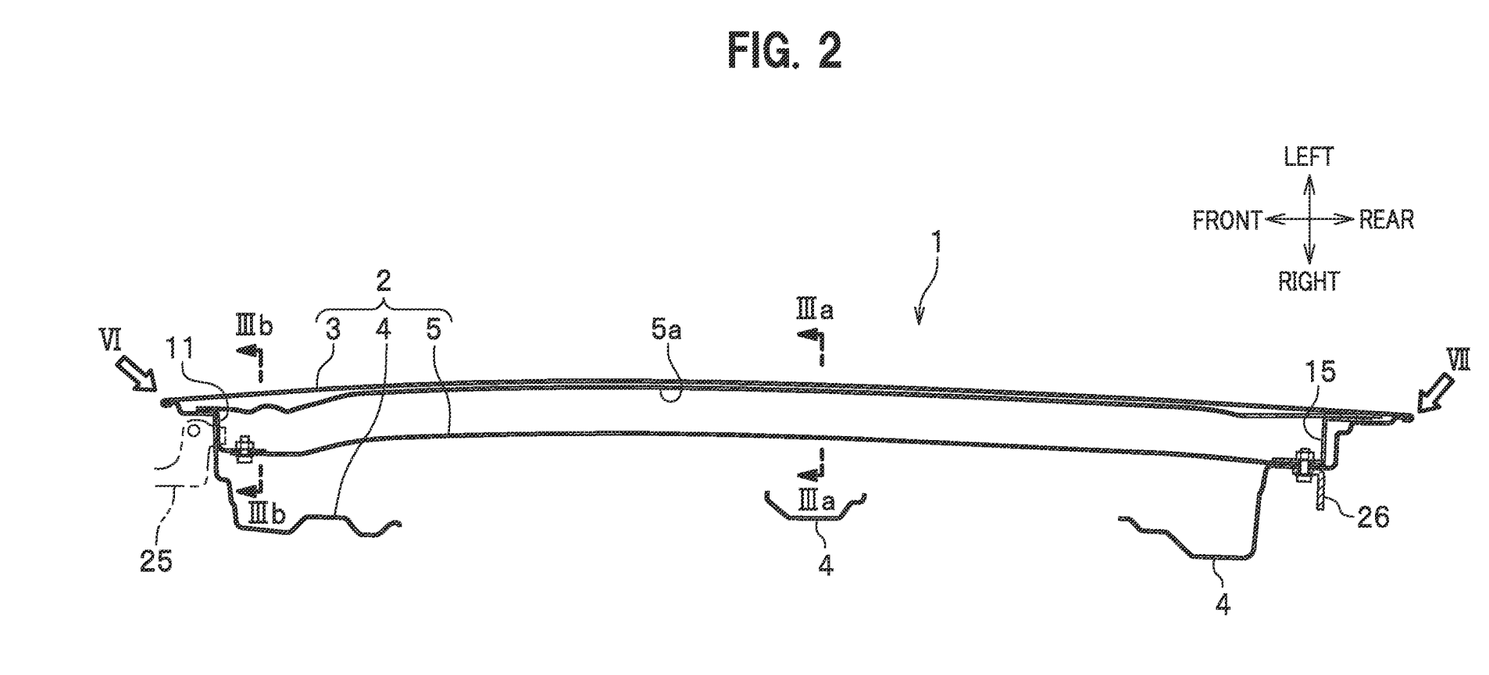
FIG. 2 is a cross-sectional view taken along a line II-II of FIG. 1.

FIG. 1 is a side view of a side door 2 on the vehicle left side to which a side door structure 1 according to this embodiment is applied. FIG. 2 is a cross-sectional view taken along a line II-II of FIG. 1. The front, rear, up, down, right, and left directions in this embodiment coincide with the front, rear, up, down, right, and left directions of a vehicle. In FIG. 1, a door skin 3 (see FIG. 2) is omitted for the sake of convenience of drawing.

Hereinbelow, only the side door structure 1 applied to the side door 2 on the vehicle left side is described, and descriptions of the side door structure 1 applied to the side door 2 on the right side, which is a symmetric structure of the former about a vehicle body center axis, are omitted.

<Side Door>

The side door 2 shown in FIG. 1 to which the side door structure 1 of this embodiment is applied is attached to the vehicle body side via a hinge so as to open and close an opening in a vehicle side portion (not shown).

As shown in FIG. 2, the side door 2 includes an inner panel 4 and the door skin 3 arranged on an outer side in a vehicle-width direction (left side in FIG. 2) of the inner panel 4.

The door skin 3 in this embodiment is arranged at a predetermined interval from the inner panel 4. With this, a hollow portion is defined between the door skin 3 and the inner panel 4. Note that the door skin 3 in this embodiment is assumed to be bent and joined by the hemming process (hemming joined) to a peripheral edge of the inner panel 4.

A door beam 5 is arranged on the inner panel 4 so as to extend along an inner surface of the inner panel 4.

The door beam 5 is inclined gradually downward as extending rearward in the side view of the side door 2 shown in FIG. 1.

Note that the door beam 5 in this embodiment extends to bridge from an upper hinge 25, out of an upper and lower pair of hinges 25, 25 of the side door 2, to an engagement hook 26 that is engaged with the vehicle body when the side door 2 is closed, as described in detail below.

<Side Door Structure>

Next, the side door structure 1 (see FIG. 1) of this embodiment is described.

As shown in FIG. 2, which is a cross-sectional view taken along a line II-II of FIG. 1, the side door structure 1 of this embodiment includes the door beam 5 arranged between the door skin 3 and the inner panel 4 of the side door 2. In FIG. 2, the hinge 25 is indicated by a virtual line (dashed-two dotted line) for the sake of convenience of drawing.

The door beam 5 extends along an inner wall surface of the door skin 3 that is arranged on the outer side in the vehicle-width direction (left side in FIG. 2) in the closed side door 2. Specifically, the door beam 5 is curved such that a general portion 5a, which occupies almost entire door beam 5 in a longitudinal direction except two end portions at front and rear of the door beam 5, slightly protrudes toward the outer side in the vehicle-width direction in accordance with a curvature of a curved surface of the door skin 3 that protrudes outward.

Note that an interval between the door skin 3 and the general portion 5a of the door beam 5 shown in FIG. 2 is drawn exaggeratedly, and the door skin 3 and the general portion 5a of the door beam 5 in this embodiment are put in close contact with each other via mastic sealer (illustration is omitted).

As described in detail below, a front end of the door beam 5 in this embodiment is joined with the inner panel 4 via a hinge reinforcement member 11. A rear end of the door beam 5 in this embodiment is joined with the inner panel 4 via a reinforcement member 15 for the engagement hook 26 (engagement member).

Next, the door beam 5 (see FIG. 2) is described more in detail.

Figure 3A:
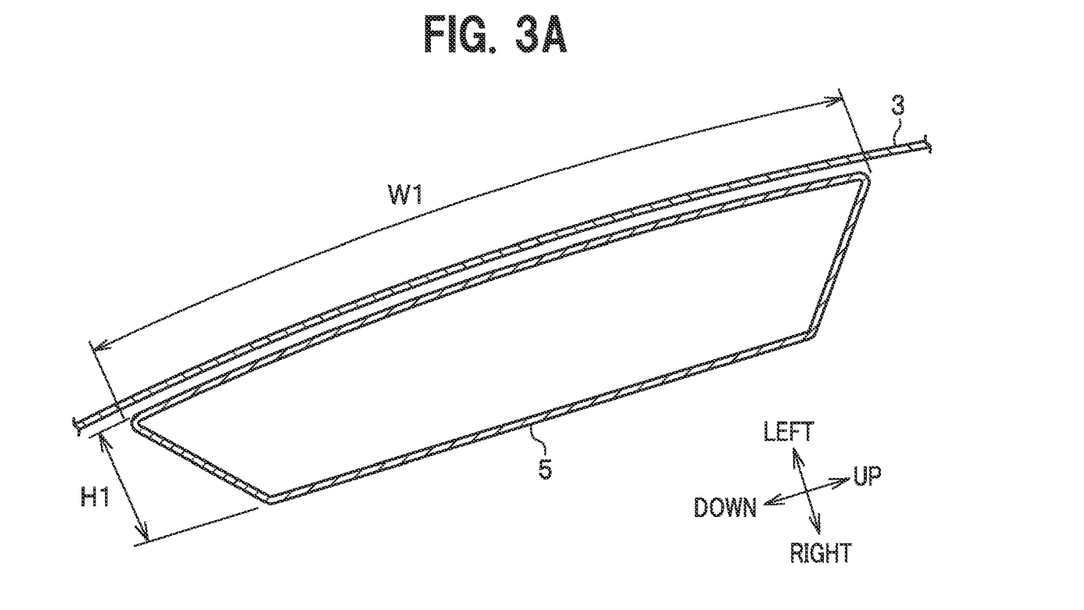
FIG. 3A is a cross-sectional view taken along a line IIIa-IIIa of FIG. 2.
Figure 3B:
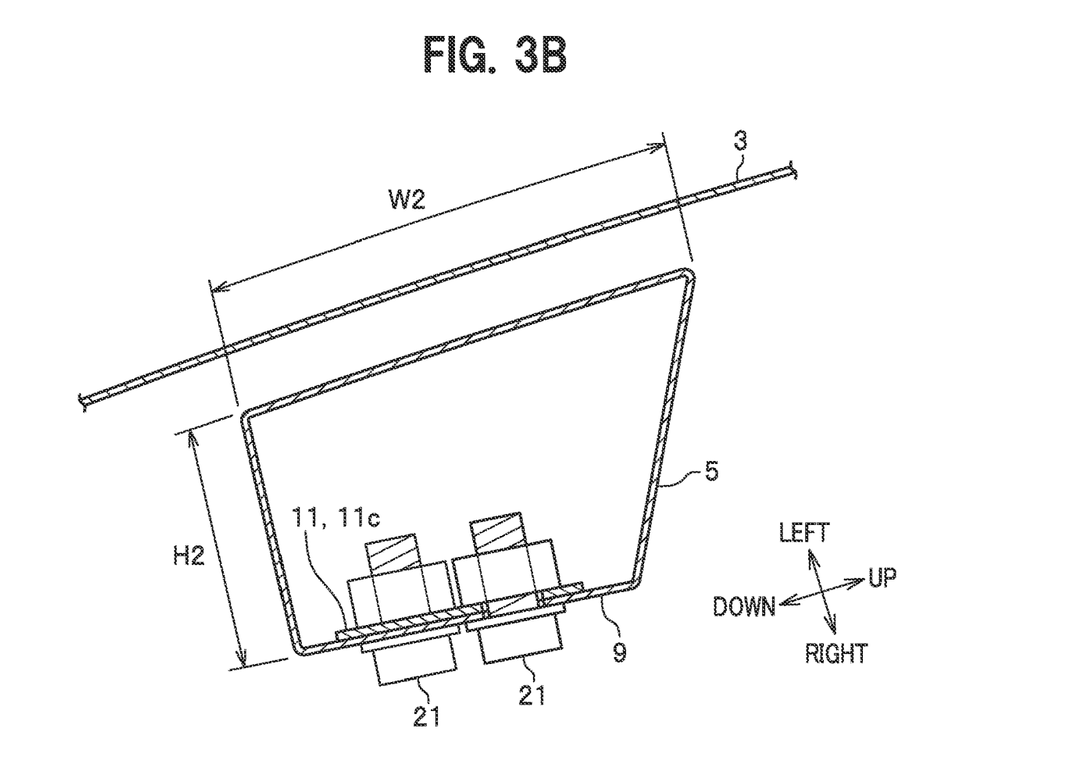
FIG. 3B is a cross-sectional view taken along a line IIIb-IIIb of FIG. 2.
Figure 4:
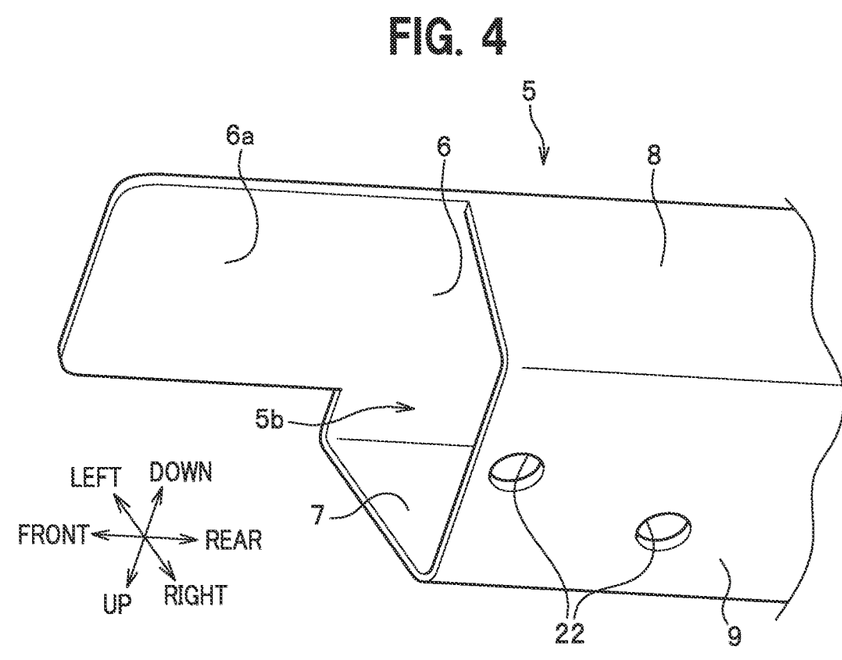
FIG. 4 is a partially enlarged perspective view of an end portion of a door beam.

FIG. 3A is a cross-sectional view taken along a line IIIa-IIIa of FIG. 2. FIG. 3B is a cross-sectional view taken along a line IIIb-IIIb of FIG. 2. FIG. 4 is a partially enlarged perspective view of an end portion of the door beam 5.

As shown in FIGS. 3A and 3B, the door beam 5 is formed in a tubular body having a hollow section (closed section). The door beam 5 in this embodiment is assumed to be a beam formed of a hydroformed body obtained by press-molding by applying water pressure to an inside of a pipe as a raw material arranged in a predetermined mold, a pipe-shaped beam that is press-molded, a press-molded beam, or the like.

Next, a gradually changing closed section structure of the door beam 5 in this embodiment is described.

As shown in FIG. 3A, a cross sectional shape in a center portion of the door beam 5 in a longitudinal direction (axial direction) has a substantial isosceles trapezoid shape. Specifically, the shape is a flat substantial isosceles trapezoid shape in which an up-down width W1 is longer than a right-left height H1. The lower base that is longer than an upper base faces the door skin 3.

The door beam 5 in this embodiment has a substantially constant perimeter around the axis in the longitudinal direction (axial direction). The cross sectional shape of the door beam 5 has an up-down width gradually reduced from the center portion toward the end portion. That is, in the door beam 5 having the constant perimeter, the end portion of the door beam 5 in the longitudinal direction has a greater right-left height (depth of the side door 2 (see FIG. 1) in a thickness direction) than that in the center portion.

As shown in FIG. 3B, the cross sectional shape of the door beam 5 in the end portion as described above is a substantial right trapezoid having H2 as a right-left height and W2 as an up-down width. As for the relationship with the cross sectional shape of the door beam 5 in the center portion, relational expressions of a right-left height H1<H2 and an up-down width W1>W2 are satisfied.

FIG. 4 is a partially enlarged perspective view of the front end portion of the door beam 5.

As shown in FIG. 4, an opening 5b in the front end portion of the door beam 5 has substantially the same shape as the cross sectional shape shown in FIG. 3B (substantial right trapezoid).

The door beam 5 includes an outer wall 6, an upper wall 7, a lower wall 8, and an inner wall 9.

Further, the outer wall 6 includes an extending portion 6a that extends forward of the other upper wall 7, lower wall 8, and inner wall 9.

Note that, in FIG. 1, each of reference signs 22, 22 indicates an insertion hole for a bolt fastened with an inner end portion 11c of the hinge reinforcement member 11 (see FIG. 5) to be described below.

The shape of the front end portion of the door beam 5 including the extending portion 6a as described above is formed by a laser cutting process on the end portion of the door beam 5 taken out of a mold after molding.

Next, the hinge reinforcement member 11 (see FIG. 2) is described.

Figure 5:
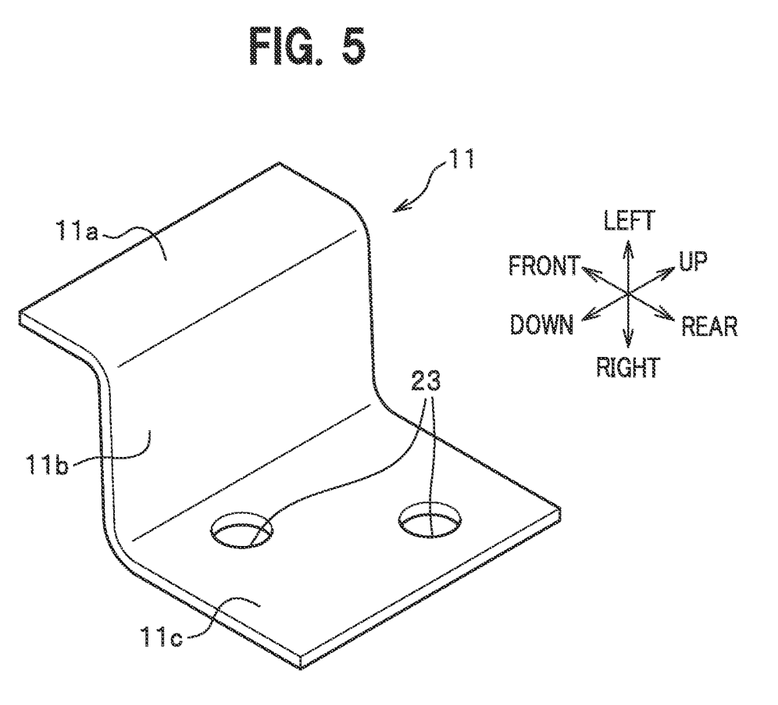
FIG. 5 is an overall perspective view of a hinge reinforcement member.

FIG. 5 is an overall perspective view of the hinge reinforcement member 11.

As shown in FIG. 5, the hinge reinforcement member 11 is a bent body obtained by processing a plate body to have a crank shape.

The hinge reinforcement member 11 includes an outer end portion 11a, a middle portion 11b, and the inner end portion 11c.

In FIG. 5, each of reference signs 23, 23 is an insertion hole for a bolt provided to correspond to the insertion holes 22, 22 for a bolt of the door beam 5 (see FIG. 4).

Figure 6:
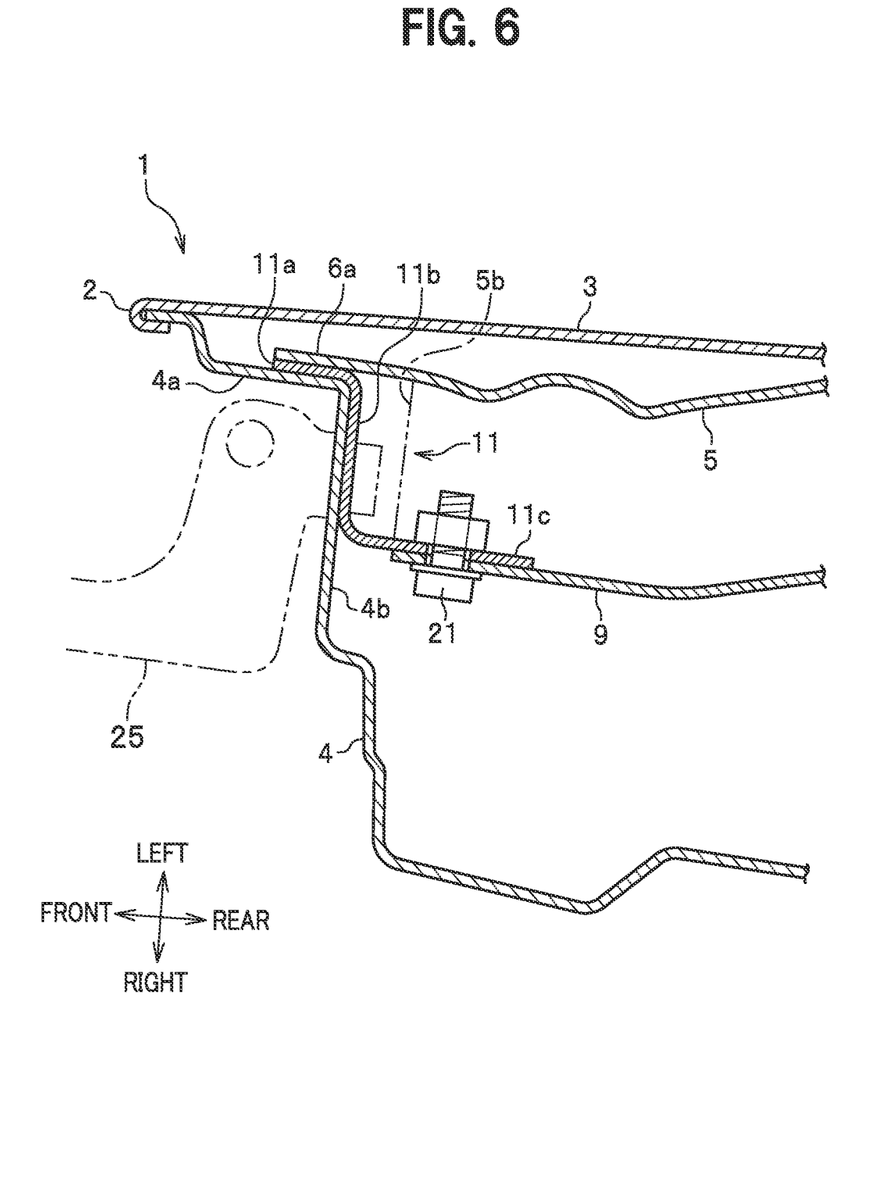
FIG. 6 is a partially enlarged view of a portion indicated by an arrow VI in FIG. 2.

FIG. 6 is a partially enlarged view of a portion indicated by an arrow VI in FIG. 2.

As shown in FIG. 6, the hinge reinforcement member 11 is arranged to close the opening 5b in the end portion of the door beam 5 and is also joined to each of the inner panel 4 and the door beam 5.

Specifically, as shown in FIG. 6, the inner panel 4 forms a step portion facing a vehicle body step portion, which forms an opening (not shown) in the vehicle side portion, by a stepped outer side wall 4a extending rearward in parallel to the door skin 3 from the front end hemming-joined with the door skin 3 and by a stepped vertical wall 4b extending from a rear end edge of the stepped outer side wall 4a to an inner side in the vehicle-width direction (right side in FIG. 6).

The outer end portion 11a of the hinge reinforcement member 11 is sandwiched between the stepped outer side wall 4a of the inner panel 4 and the extending portion 6a of the door beam 5 and is spot-welded in three layers.

The middle portion 11b of the hinge reinforcement member 11 closing the opening 5b of the door beam 5 is spot-welded with the stepped vertical wall 4b of the inner panel 4 in two layers. A pivoting side of the hinge 25 is fastened by a bolt to the two-layered portion of the middle portion 11b and the stepped vertical wall 4b.

The inner end portion 11c of the hinge reinforcement member 11 is inserted to an inside of the door beam 5 from the opening 5b in the door beam 5, is layered on the inner wall 9 of the door beam 5, and is fastened with a pair of bolts 21.

In this process, the bolts 21 are inserted into the insertion holes 22 in the door beam 5 shown in FIG. 4 and into the insertion holes 23 in the hinge reinforcement member 11 shown in FIG. 5.

With this, as shown in FIG. 3B, each of the pair of bolts 21, 21 joins the inner wall 9 of the door beam 5 with the inner end portion 11c of the hinge reinforcement member 11 at two portions. Specifically, each of the bolts 21, 21 is inserted into the insertion hole 22 shown in FIG. 4 and the insertion hole 23 shown in FIG. 5, and thus the inner wall 9 and the inner end portion 11c are joined with each other at two portions offset in a front-rear direction and an up-down direction. Note that the joining of the inner wall 9 and the inner end portion 11c may be made at three or more portions, or may be not limited to the bolt fastening and may be made by another mechanical joining such as rivet joining.

Next, joining of a rear end portion of the door beam 5 to the inner panel 4 is described.

Figure 7:
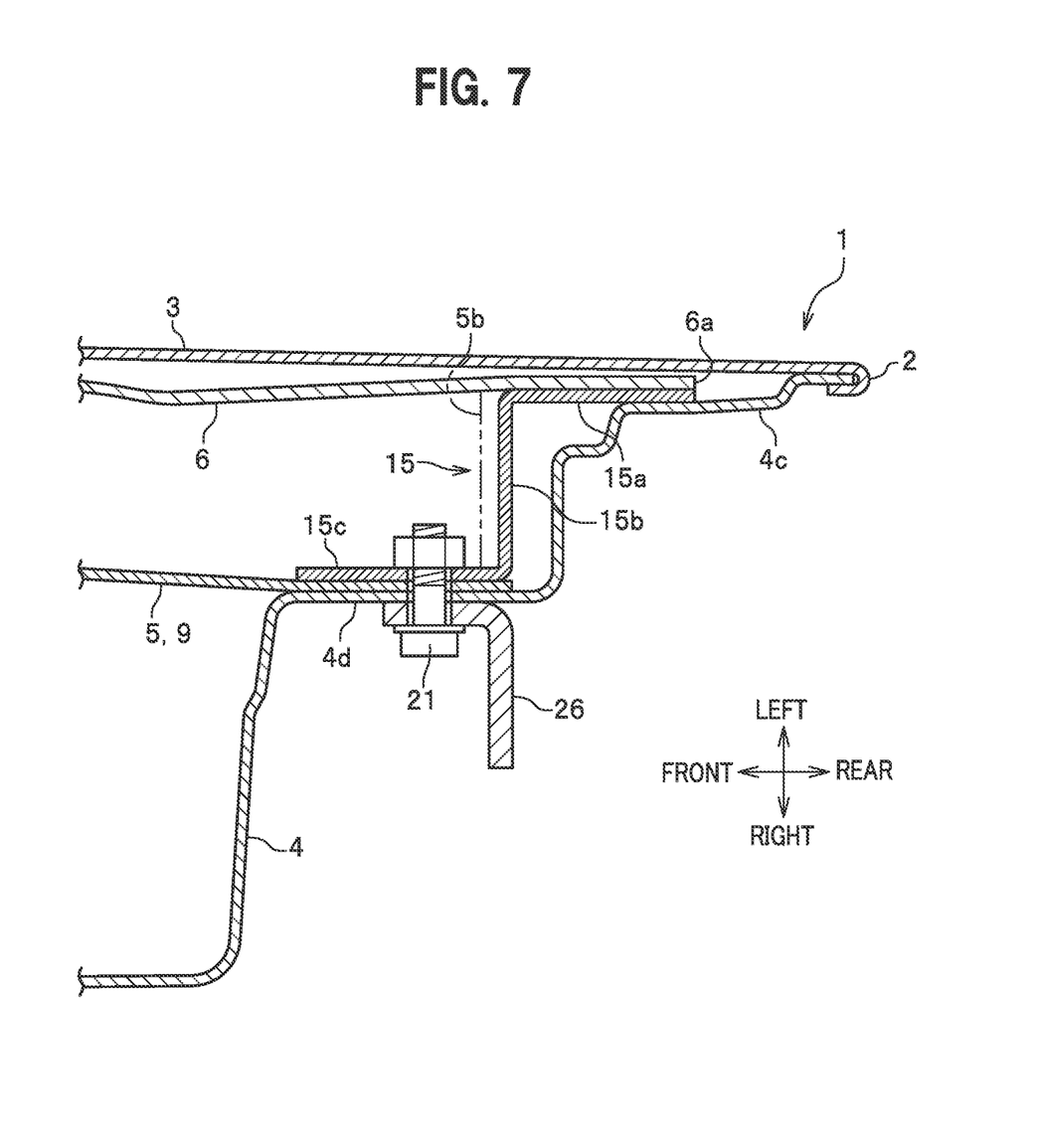
FIG. 7 is a partially enlarged view of a portion indicated by an arrow VII in FIG. 2.

FIG. 7 is a partially enlarged view of a portion indicated by an arrow VII in FIG. 2.

As shown in FIG. 7, in the rear end portion of the door beam 5, as with the front end portion of the door beam 5, the extending portion 6a is formed in the outer wall 6 by a laser cutting process. Further, the rear end portion of the door beam 5 is joined to the inner panel 4 via the reinforcement member 15 for the engagement hook 26 (engagement member) of the side door 2 (see FIG. 1).

Note that the engagement hook 26 in this embodiment is formed of a thick steel plate bent in an L-shape. Though not shown, in the engagement hook 26, a portion protruding to an inner side in the vehicle-width direction (right side in FIG. 7) from a rear portion of the closed side door 2 (see FIG. 1) is configured to be fitted into a catcher as an engagement hole formed in the vehicle body side such as a B pillar, for example.

According to the engagement hook 26 (engagement member) as described above, in a case of side impact against the vehicle, the side door 2 is more securely prevented from being bent at the center and breaking into the vehicle compartment.

Next, joining of the door beam 5 to the inner panel 4 via the reinforcement member 15 for the engagement hook 26 is described.

As shown in FIG. 7, the reinforcement member 15 is a bent body obtained by processing a plate body in a crank shape.

As with the hinge reinforcement member 11 (see FIG. 5), the reinforcement member 15 includes an outer end portion 15a, a middle portion 15b, and an inner end portion 15c.

In contrast, as shown in FIG. 7, the inner panel 4 in the rear portion of the side door 2 forms a stepped outer side wall 4c extending forward in parallel to the door skin 3 from the rear end hemming-joined with the door skin 3 and a stepped inner side wall 4d bending forward in the middle of extending from a front end edge of the stepped outer side wall 4c to an inner side in the vehicle-width direction (right side in FIG. 7).

As shown in FIG. 7, the outer end portion 15a of the reinforcement member 15 is sandwiched between the stepped outer side wall 4c of the inner panel 4 and the extending portion 6a of the door beam 5 and spot-welded in three layers.

The middle portion 15b of the reinforcement member 15 is arranged to close the opening 5b in the door beam 5.

The inner end portion 15c of the reinforcement member 15 is inserted to an inside of the door beam 5 from the opening 5b in the door beam 5. Accordingly, four parts, which are the inner end portion 15c, the inner wall 9 of the door beam 5, the stepped inner side wall 4d of the inner panel 4, and the engagement hook 26, are layered in this order. These parts are fastened in four layers by the pair of bolts 21. The pair of bolts 21 join these four parts at two portions offset in the front-rear direction and the up-down direction. Note that the joining of the inner wall 9 to the inner end portion 11c may be made at three or more portions, or may be not limited to the bolt fastening and may be made by another mechanical joining such as rivet joining.

Advantageous Effects

Next, advantageous effects achieved by the side door structure 1 according to this embodiment are described.

In the side door structure 1 according to this embodiment, the hinge reinforcement member 11 is arranged to close the opening 5b in the front end portion of the door beam 5 having a hollow section (closed section) and is joined to each of the door beam 5 and the inner panel 4.

According to the side door structure 1 as described above, since the door beam 5 is tightly joined with the vehicle body by the hinge 25, the end portion of the door beam 5 is not crushed nor bent in a case of side impact against the vehicle. Therefore, the side door structure 1 can reduce deformation stroke of the side door 2 toward inside of the vehicle compartment.

In the side door structure 1, the cross section perimeter of the door beam 5 crossing in the longitudinal direction is set to be constant in the longitudinal direction. The door beam 5 is formed so as to include the center portion and the end portion in the longitudinal direction having different depths in the thickness direction of the side door 2.

According to the side door structure as described above, it is possible to design so as to further enhance the strength of the door beam 5 against the bending moment during side impact. According to the side door structure 1 as described above, since the perimeter of the door beam 5 is not long, it is possible to inhibit an increase in the weight of the door beam 5 while improving the strength thereof.

For example, in the door beam 5 as in the embodiment, with the depths of the side door 2 in the thickness direction set such that the end portion is deeper than the center portion in the longitudinal direction, it is possible to further enhance the strength of the door beam 5 against the bending moment during side impact, since the depth of the end portion is deeper than that of the center portion in the door beam 5.

In the side door structure 1, the inner end portion 11*c* of the hinge reinforcement member 11 and the inner wall 9 of the door beam 5 are mechanically joined with each other at at least two or more portions offset in the front-rear direction and the up-down direction.

In the side door structure 1, the door beam 5 during side impact receives a load in a tensile direction. Meanwhile, the inner wall 9 at the front end portion of the door beam 5 that is connected with the vehicle body via the hinge reinforcement member 11 is mechanically joined at two or more portions offset in the front-rear direction and the up-down direction. Accordingly, the side door structure 1 can disperse two-dimensionally the load applied to the end portion of the door beam 5. The side door structure 1 can inhibit occurrence of a crack and the like in the end portion of the door beam 5.

In the side door structure 1, the reinforcement member 15 for the engagement hook 26 (engagement member) is arranged to close the opening 5*b* in the rear end portion of the door beam 5 having a hollow section (closed section) and is also joined to each of the rear end portion of the door beam 5 and the inner panel 4.

According to the side door structure 1 as described above, since the rear end portion of the door beam 5 is tightly joined with the vehicle body by the engagement hook 26 (engagement member), the rear end portion of the door beam 5 is not crushed nor bent in a case of side impact against the vehicle. Thus, the side door structure 1 can reduce deformation stroke of the side door 2 toward inside of the vehicle compartment.

In the side door structure 1, the inner end portion 15*c* of the reinforcement member 15 for the engagement hook 26 (engagement member) and the inner wall 9 of the door beam 5 are mechanically joined with each other at at least two or more portions offset in the front-rear direction and the up-down direction.

In the side door structure 1, the door beam 5 during side impact receives a load in a tensile direction. Meanwhile, the inner wall 9 at the rear end portion of the door beam 5 that is connected with the vehicle body via the reinforcement member 15 is mechanically joined at two or more portions offset in the front-rear direction and the up-down direction. Accordingly, the side door structure 1 can disperse two-dimensionally the load applied to the rear end portion of the door beam 5. The side door structure 1 can inhibit occurrence of a crack and the like in the rear end portion of the door beam 5.

In the side door structure 1, the door beam 5 is curved along the door skin 3, and the mastic sealer (viscoelastic member) is applied between the door beam 5 and the door skin 3.

According to the side door structure 1 as described above, with the door beam 5 formed along the door skin 3, reaction force against the input load acts promptly from an initial period during side impact. According to the side door structure 1, since the mastic sealer can be applied to the entire outer surface of the door beam 5 facing the door skin 3, it is possible to enhance surface stiffness of the door skin 3 and to enhance vibration suppression operation in the side door 2. There is no need of a bracket for applying the mastic sealer between the door beam 5 and the door skin 3.

In the side door structure 1, the front end portion of the door beam 5 only includes the outer wall 6 extended in the longitudinal direction, and the outer end portion 11*a* of the hinge reinforcement member 11 is sandwiched and joined between the outer wall 6 and the stepped outer side wall 4*a* of the inner panel 4.

According to the side door structure 1 as described above, since only the outer wall 6 at the front end portion of the door beam 5 is extended, it is possible to easily join the door beam 5, the inner panel 4, and the hinge reinforcement member 11 in layers. It is possible to easily form the shape by a laser cutting process, in which only the outer wall 6 of the door beam 5 is extended as described above.

The door beam 5 of the side door structure 1 is a hydroformed body.

According to the side door structure 1 as described above, it is possible to easily form the door beam 5 having a gradually changing closed section structure, in which the center portion in the longitudinal direction is flat and a thickness is increased in the vehicle-width direction as being closer to the end portions.

The door beam 5 of the side door structure 1 is a press-molded body.

According to the side door structure 1 as described above, productivity of the door beam 5 is improved.

Although the embodiment of the present disclosure is described above, the present disclosure is not limited thereto and can be implemented variously.

With the side door structure 1 of the embodiment, an example of using the engagement hook 26 as an engagement member is described, but the engagement member may have the following structure using an engagement pin (first modification).

Figure 8:
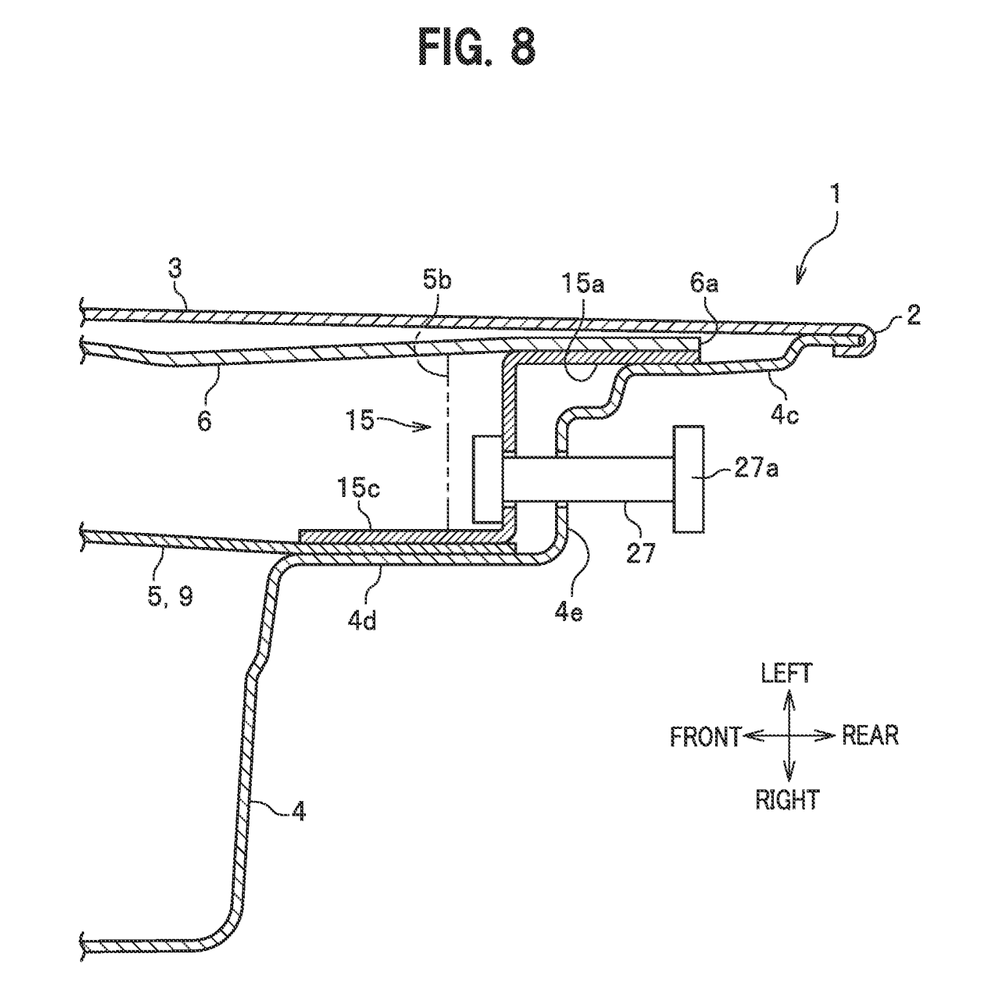
FIG. 8 is a partially enlarged view of a periphery of a rear end portion of a door beam in a side door structure for a vehicle according to a first modification.

FIG. 8 is a partially enlarged view of a periphery of the rear end portion of the door beam 5 in the side door structure 1 according to the first modification.

As shown in FIG. 8, the side door structure 1 according to the first modification includes an engagement pin 27 as an engagement member instead of the engagement hook 26 (see FIG. 7) in the above embodiment.

In the first modification, with the omission of the engagement hook 26 in the above embodiment shown in FIG. 7, the inner end portion 15*c* of the reinforcement member 15 is layered with the inner wall 9 of the door beam 5 and the stepped inner side wall 4*d* of the inner panel 4 in three layers. The three-layered portion is spot-welded instead of the bolt fastening in the above embodiment.

As with the above embodiment, the outer end portion 15*a* of the reinforcement member 15 is sandwiched between the stepped outer side wall 4*c* of the inner panel 4 and the extending portion 6*a* of the door beam 5 and is spot-welded in three layers.

The middle portion 15*b* of the reinforcement member 15 is arranged to close the opening 5*b* in the door beam 5.

The engagement pin 27 extends to pass through a stepped vertical wall 4*e* extending between the stepped outer side wall 4*c* and the stepped inner side wall 4*d* of the inner panel 4 in the vehicle-width direction (right-left direction in FIG. 8) and to pass through the middle portion 15*b* of the reinforcement member 15.

Though not shown, in the engagement pin 27, a head portion 27*a* at a tip end that protrudes rearward from the rear portion of the closed side door 2 is engaged to a catcher bracket provided on the vehicle body, that is a B pillar or the like, for example, and forward displacement of the head portion 27*a* is thus prohibited.

According to the side door structure 1 including the engagement pin 27 (engagement member) as described above, in a case of side impact against the vehicle, the side door 2 is prevented from being bent at the center and breaking into the vehicle compartment.

Next, the door beam 5 of the side door structure 1 according to a second modification is described.

Figure 9:
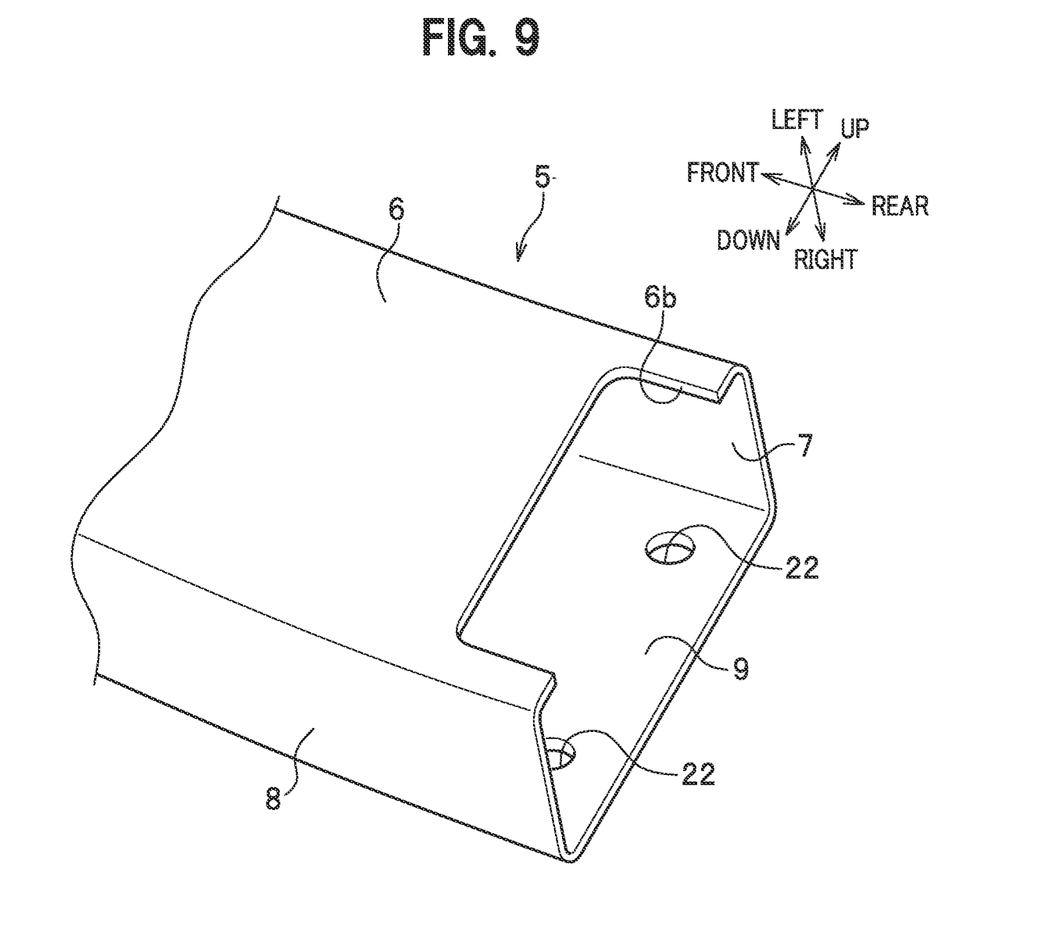
FIG. 9 is a partially enlarged perspective view of a rear end portion of a door beam in a side door structure for a vehicle according to a second modification.
Figure 10:
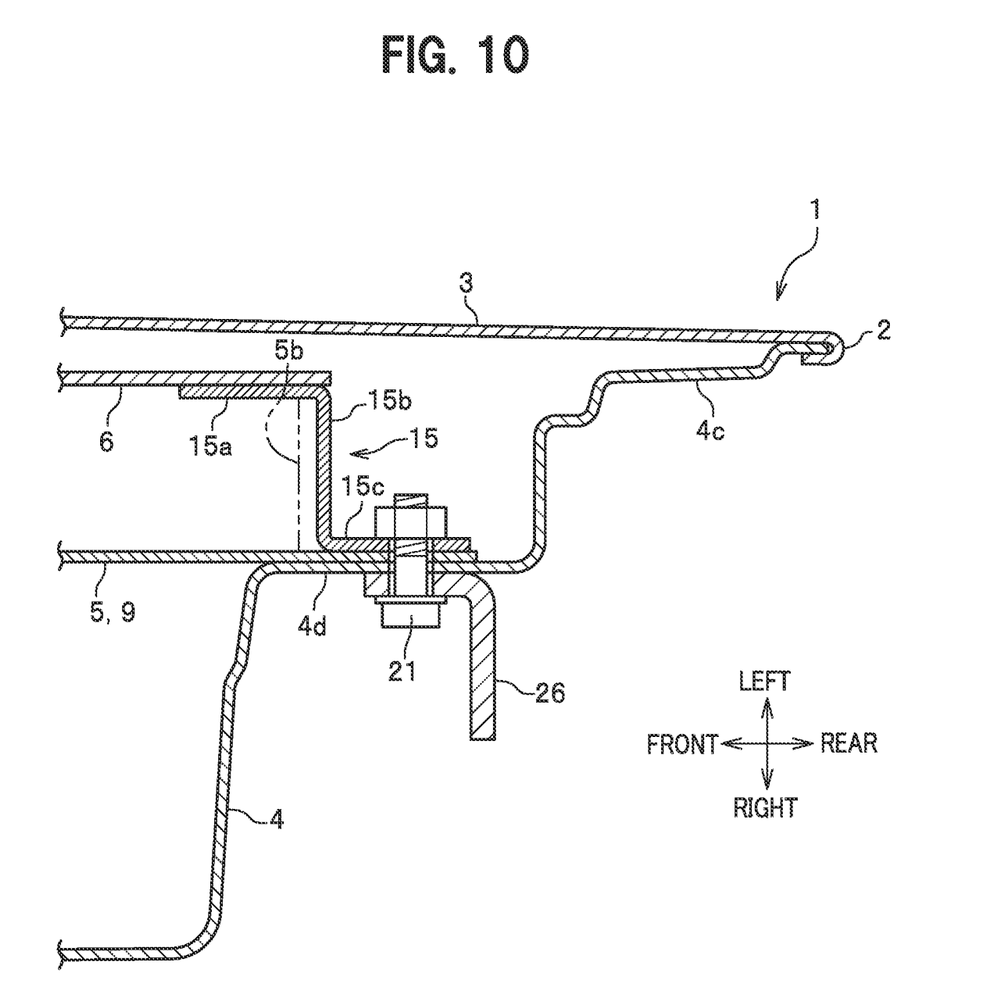
FIG. 10 is a partially enlarged view of a periphery of the rear end portion of the door beam in the side door structure for a vehicle according to the second modification.

FIG. 9 is a partially enlarged perspective view of the rear end portion of the door beam 5 according to the second modification. FIG. 10 is a partially enlarged view of a periphery of the rear end portion of the door beam 5 according to the second modification.

As shown in FIG. 9, unlike the door beam 5 (see FIG. 7) including the extending portion 6a (see FIG. 7) in the above embodiment, the outer wall 6 of the door beam 5 according to the second modification includes a notch portion 6b in the outer wall 6. As with the front end portion of the door beam 5, the rear end portion of the door beam 5 including the notch portion 6b as described above is formed by a laser cutting process.

In the rear end portion of the door beam 5 in the second modification, a rear edge of the outer wall 6 is positioned forward of rear edges of the other upper wall 7, lower wall 8, and inner wall 9. Accordingly, via the notch portion 6b, a user can see each of the insertion holes 22, 22 for bolts formed in the inner wall 9.

As shown in FIG. 10, the reinforcement member 15 is arranged opposite in the front-rear direction to the direction of the reinforcement member 15 shown in FIG. 7, and the middle portion 15b closes the opening 5b in the door beam 5.

The outer end portion 15a of the reinforcement member 15 is inserted to an inside of the door beam 5 from the opening 5b in the door beam 5 and is spot-welded with the outer wall 6 of the door beam 5 in two layers.

On the inner end portion 15c of the reinforcement member 15, the inner wall 9 of the door beam 5, the stepped inner side wall 4d of the inner panel 4, and the engagement hook 26 are layered in this order. These parts are fastened by the pair of bolts 21 in four layers. Although not shown, these four parts may be mechanically joined by bolt fastening or the like at two or more portions offset in the front-rear direction and the up-down direction.

According to the side door structure 1 as described above, since the outer wall 6 of the door beam 5 includes the notch portion 6b, the engagement hook 26 (engagement member) is easily attached to the door beam 5 by the bolts 21. The shape of the door beam 5 including the notch portion 6b in the outer wall 6 as described above can be easily formed by a laser cutting process.

As shown in FIG. 1, the side door structure 1 according to the above embodiment and modifications is assumed to be a pivoting door that includes the hinge 25 on a front side of the side door 2 and opens at a rear end. However, though not shown, the side door structure 1 is also applicable to a pair of side doors 2 as double doors. In the pair of side doors 2 as double doors as described above, the side door 2 on the rear side that opens at the front end and the side door 2 on the front side that opens at the rear end have a symmetric structure in the front-rear direction.

Therefore, in the side door 2 on the rear side that opens at the front end, the hinge reinforcement member 11 is joined to the rear end of the door beam 5, and the middle portion 11b thereof closes the opening on the rear side of the door beam 5. The reinforcement member 15 for the engagement member (engagement hook 26, engagement pin 27) is joined to the front end of the door beam 5, and the middle portion 15b thereof closes the opening in the front end of the door beam 5.

What is claimed is:

1. A side door structure for a vehicle, comprising:
    a door beam that has hollow sections which are open at two ends in a longitudinal direction; and
    a hinge reinforcement member including a bent plate body in a crank shape that is joined to one of a front end and a rear end of the door beam, wherein
    the hinge reinforcement member forms the crank shape by integrally forming
        a middle portion that closes an opening in the one of the front end and the rear end of the door beam and is joined to a stepped vertical wall of an inner panel of a side door,
        an outer end portion that is joined to a stepped outer side wall of the inner panel and an outer wall of the door beam, and
        an inner end portion that is joined to an inner wall of the door beam.

2. The side door structure for the vehicle according to claim 1, wherein
    the door beam includes a center portion and an end portion in the longitudinal direction having different depths in a thickness direction of the side door, and a cross section perimeter of the door beam crossing in the longitudinal direction is set to be constant in the longitudinal direction.

3. The side door structure for the vehicle according to claim 1, wherein
    the inner end portion of the hinge reinforcement member and the inner wall of the door beam are mechanically joined with each other at at least two portions offset in a front-rear direction and an up-down direction.

4. The side door structure for the vehicle according to claim 1, further comprising:
    an engagement member that engages the side door with a vehicle body; and
    a reinforcement member for the engagement member formed of a bent plate body in a crank shape that is joined to the other one of the front end and the rear end of the door beam, wherein
    the reinforcement member for the engagement member forms the crank shape by integrally forming
        a middle portion that closes an opening in the other one of the front end and the rear end of the door beam,
        an outer end portion that is joined to a stepped outer side wall of the inner panel and the outer wall of the door beam, and
        an inner end portion that is joined to the inner wall of the door beam and a stepped inner side wall of the inner panel, and
    the engagement member is fixed to the inner end portion or the middle portion.

5. The side door structure for the vehicle according to claim 4, wherein
    the inner end portion in the reinforcement member for the engagement member and the inner wall of the door beam are mechanically joined with each other at at least two portions offset in a front-rear direction and an up-down direction.

6. The side door structure for the vehicle according to claim 1, wherein
    the door beam is curved along a door skin, and a viscoelastic member is arranged between the door beam and the door skin.

7. The side door structure for the vehicle according to claim 1, wherein
    only the outer wall is extended in the longitudinal direction in the one of the front end and the rear end of the door beam, and the outer end portion of the hinge reinforcement member is sandwiched and joined between the outer wall and the stepped outer side wall of the inner panel.

8. The side door structure for the vehicle according to claim 1, further comprising:
an engagement member that engages the side door with a vehicle body; and
a reinforcement member for the engagement member formed of a bent plate body in a crank shape that is joined to the other one of the front end and the rear end of the door beam, wherein
only the outer wall is partially notched out of the outer wall and the inner wall of the door beam forming the other one of the front end and the rear end of the door beam, and a bolt fastening portion is formed in the inner wall at the rear end of the door beam,
the reinforcement member for the engagement member forms the crank shape by integrally forming
a middle portion that closes an opening in the other one of the front end and the rear end of the door beam,
an outer end portion that is joined to the outer wall of the door beam, and
an inner end portion that joins the inner wall of the door beam and the engagement member via the bolt fastening portion.

9. The side door structure for the vehicle according to claim 1, wherein
the door beam is a hydroformed body.

10. The side door structure for the vehicle according to claim 1, wherein
the door beam is a pipe-shaped beam that is press-molded or a press-molded beam.

* * * * *